United States Patent [19]
Yamashita et al.

[11] 3,761,710
[45] Sept. 25, 1973

[54] COMPLEX THERMOLUMINESCENCE DOSIMETER

[75] Inventors: Tadaoki Yamashita; Osamu Yamamoto, both of Hirakata; Hajimu Oonishi, Neyagawa; Hidetsugu Kawabata, Kobe; Saburo Kitamura, Kyoto, all of Japan

[73] Assignee: Matsushita Electric Industrial Co., Ltd., Osaka, Japan

[22] Filed: Feb. 8, 1972

[21] Appl. No.: 224,640

Related U.S. Application Data

[63] Continuation of Ser. No. 26,676, April 8, 1970, abandoned.

[30] Foreign Application Priority Data

| Apr. 15, 1969 | Japan | 44/30542 |
| Apr. 30, 1969 | Japan | 44/34383 |
| Apr. 30, 1969 | Japan | 44/34384 |
| Apr. 15, 1969 | Japan | 44/36177 |

[52] U.S. Cl. ............................................. 250/71 R
[51] Int. Cl. ............................................. G01t 1/11
[58] Field of Search ..................... 250/71 R, 71.5 R

[56] References Cited
UNITED STATES PATENTS

| 3,420,999 | 1/1969 | Distenfeld | 250/83.1 |
| 3,590,245 | 6/1971 | Oonishi et al. | 250/71 R |

*Primary Examiner*—James W. Lawrence
*Assistant Examiner*—Davis L. Willis
*Attorney*—Robert J. Frank

[57] ABSTRACT

Complex thermoluminescence dosimeter comprising a plurality of thermoluminescent elements secured to a single frame, whereby the accuracy of measurement can be increased and the handling can be simplified. The present dosimeter is in particular useful for a general analysis of ionizing radiations including measurement of neutrons.

3 Claims, 6 Drawing Figures

PATENTED SEP 25 1973　　3,761,710
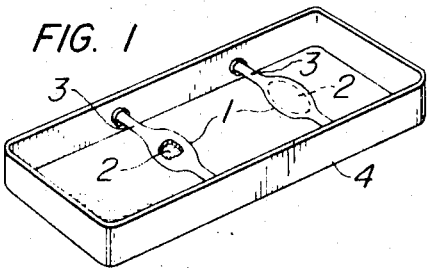
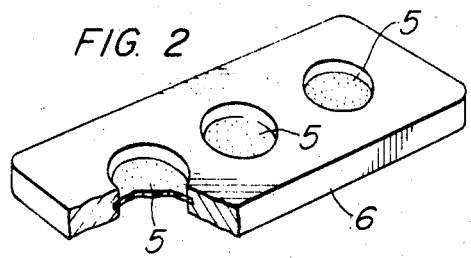
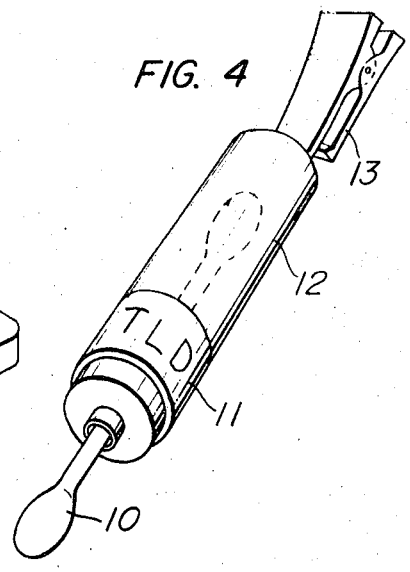
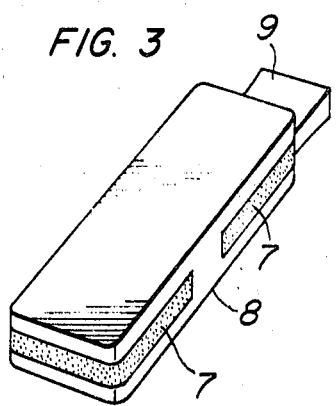
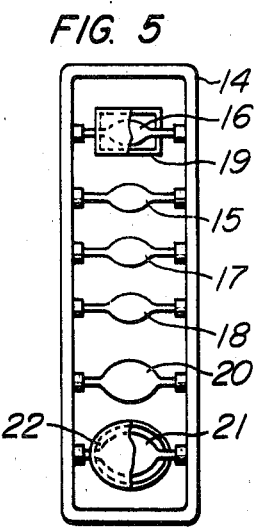
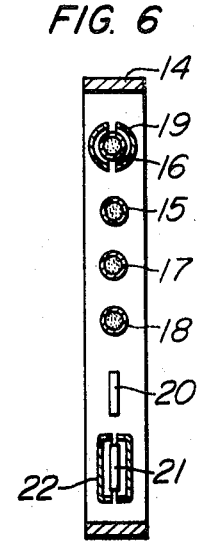

COMPLEX THERMOLUMINESCENCE DOSIMETER

This is a continuation, of application Ser. No. 26,676, filed Apr. 8, 1970.

The present invention relates to a thermoluminescence dosimeter for measuring ionizing radiations such as γ-rays, X-rays, β-rays and neutrons, and has an object to increase the reliability of the dosimeter and to simplify its handling.

It has been recognized that a thermoluminescence dosimeter is advantageous over a conventional film budge type or a glass type dosimeter in respect of its sensitivity and accuracy. However, a dosimeter of this type is disadvantageous in that, as soon as it is heated for measurement, the accumulated signal thereon is diminished so that one can never be informed of the value in repeating way and no failure in measurement is allowed. For this reason, in a measurement utilizing such thermoluminescence dosimeters, two or more of such dosimeters are often simultaneously used. When the measurements by the two dosimeters coincide with each other, the value is deemed as the correct measurement. However, since it is inconvenient to provide two of such dosimeters and perform measurements by inserting each of them into a measuring instrument, it has been desired to provide means for a simple handling of a plurality of dosimeters.

Further, in order to measure neutrons by using thermoluminescence dosimeters, it has been a common practice to use a dosimeter sensitive to both neutrons and γ-rays and another dosimeter sensitive to γ-rays only, the difference of the measurements of these two dosimeters being obtained to determine the amount of neutrons. In this method, since each of the two dosimeters may have a tolerance in sensitivity which may cause an error in the measurement of neutrons, it has been desired to improve the accuracy of the dosimeters. Of course, if the difference between the sensitivities of two dosimeters is compensated, the accuracy of measurement may be improved; however, such a compensation is practically impossible.

A similar problem arises in measurement of β-rays.

In view of the foregoing, the present invention is aimed at providing a simple and accurate thermoluminescence dosimeter which will take the place of inaccurate and inconvenient conventional ones.

In order that the invention will be more clearly understood, it will now be described with reference to a preferred embodiment shown in the accompanying drawings in which;

FIG. 1 is a perspective view of one embodiment of the present invention;

FIG. 2 is a perspective view of another embodiment of the present invention with a part broken away to show the structure clearly;

FIGS. 3 and 4 show perspective views of further embodiments of the present invention in which the respective dosimeter is modified so that it can be clamped on a human body;

FIG. 5 is a plan view of the embodiment shown in FIG. 3 with parts broken away to show the interior; and, FIG. 6 is a view partially sectioned on the center of the embodiment shown in FIGS. 3 and 5.

Referring to FIG. 1, the reference numeral 1 shows a glass ampule in which powders 2 of thermoluminescent crystals such as calcium sulphate ($CaSO_4$ : Tm; $CaSO_4$ : Dy), lithium fluoride (LiF), lithium borate ($Li_2B_4O_7$) and the like are sealed. The reference numeral 3 shows a portion of the glass ampule which serves as a support leg for the ampule. The numeral 4 is a metallic frame for supporting a plurality of thermoluminescent elements as constructed above. The frame 4 may be made of any suitable material such as aluminum or stainless steel and, in the illustrated embodiment, two thermoluminescent elements are secured to the frame. It is of course within the scope of the present invention to secure the elements to the frame in a removable manner so that any of the elements can be replaced by a new one when it is damaged. After the elements are exposed to radiations, they are placed in a measuring instrument to detect the intensity of the rays. The instrument in generally of such a type that it heats the elements to a temperature between 300° C. to 400° C., the thermoluminant rays then produced by the elements being received by a photo-multiplier tube and a photo-electric current produced in the tube being detected through an amplifier. The most important part of the instrument is an element heating section, and the shape of the element must be determined in accordance with the type of the heating section. The dosimeter shown in FIG. 1 and described above is suitable to such a type of instrument that heats the elements by a blast of heated air. In this type, the exposed elements are put in the measuring instrument and a blast of heated air is directed to the elements to read the thermoluminate rays.

FIG. 2 shows another type of dosimeter in which the reference numeral 5 shows a thermoluminescence element comprising thermoluminescent material moulded to a film shape using a suitable heat resistant plastic material such as polytetrafluoroethylene, polyamide and the like. The reference numeral 6 shows a frame for supporting a plurality of thermoluminescent elements 5, and in the illustrated arrangement, three of such elements 5 are secured to the frame 6. The frame 6 may be made of a metal such as aluminum or a heat resistant plastic material such as polyethylene and polytetrafluoroethylene. The dosimeter shown in FIG. 2 is also designed for use with an instrument which heats the elements by a heated blast air.

FIG. 3 shows a casing for each of the above described dosimeters. In this figure, the reference numeral 7 shows a dosimeter, 8 a casing, and 9 a clip for securing the casing 8 to a human body. The clip 9 is fixed to the casing and a plurality of dosimeters 7 are removably secured to the casing 8.

The construction of the dosimeter in accordance with the present invention has thus been described, and the invention will now be described in detail with reference to several examples.

EXAMPLE 1

In the construction of FIG. 1, calcium sulphate is selected as the thermoluminescent material. Two thermoluminescent elements are made to be identical in shape and characteristic. The dosimeter thus formed is used for the measurement of X-rays or γ-rays, and when the values measured by two elements are the same, the value is deemed to be correct. Thus, the reliability of the measurement is increased.

EXAMPLE 2

In the construction of FIG. 1, lithium fluoride is used as the thermoluminescent material. One of the elements includes lithium fluoride comprising lithium of mass number six, and the other includes that comprising lithium of mass number seven. The sensitivity to γ-rays of the two elements are made to be the same by a certain trimming process such as applying a layer of heat resistant paint to a portion of the glass ampules. Practically, it is possible to reduce the difference between the sensitivity of two elements within 0.1 percent. Among the elements, the one comprising lithium of mass number six is also sensitive to neutrons so that the difference between the signals of these two elements are considered to indicate the intensity of neutrons. Thus, by this arrangement, neutrons and γ-rays can individually be measured in such a field where both γ-rays and neutrons exist and, moreover, the measurement can be performed with high sensitivity and high accuracy.

EXAMPLE 3

In Example 1, a complex dosimeter for measuring X-rays or γ-rays has been described. The present example sets forth a dosimeter which is used for the same purpose but is further simple to handle.

In FIG. 4, the reference numeral 10 shows a thermoluminescent element comprising a material such as calcium sulphate or the like. A pair of elements 10 are secured to an aluminum holder 11, one within a cap 12 and the other outside the cap. The elements 10 are the same in sensitivity to ionizing radiations. The reference numeral 13 shows a clip for securing the dosimeter to a human body. Another cap (not shown) similar to the cap 12 may be provided to cover said other element 10. This complex dosimeter is also designed for use with a measuring instrument of heated air type and may be put in the instrument with one of the caps removed. This dosimeter is very simple to handle.

EXAMPLE 4

This example sets forth a dosimeter which may be used in a complex radiation field.

Referring to FIG. 5, the reference numeral 14 shows a frame which is made of metal or plastic material and adapted to support a plurality of thermoluminescent elements 15, 16 and 17 sensitive to ionization radiation and another thermoluminescent element 18 sensitive to both neutrons and ionization radiation. These four elements 15, 16, 17 and 18 are regulated so that their sensitivities to γ-rays are the same. The reference numeral 19 shows a radiation shield which is made of a lead material and adapted to be installed to the element 16 when the dosimeter is exposed to a radiation but removed therefrom when it is heated. The elements 15 and 16 are for the measurement of X-rays and γ-rays. The element 16 is sensitive only to γ-rays of high energy due to the existence of the lead shield. The element 15 is sensitive to X-rays and γ-rays of both high and low energy and, therefore, is equivalent to a living body. By these two elements 15 and 16, the amount of living body absorbed dose and the radiation energy can be estimated. The element 17 is sensitive to ionization radiation but insensitive to neutrons (7 LiF or $CaSO_4$ : Tm), while the element 18 is sensitive to neutrons as well as ionizing radiation (composition of 6 LiF/or $CaSO_4$ : Tm and a compound of 6 LiF). By these two elements 17 and 18, neutrons can be detected. The reference numerals 20 and 21 show thin film like thermoluminescent elements which are sensitive to ionization radiation and have the same sensitivity. The reference numeral 22 is a plate of copper or lead which is provided for removing β-rays. The element 20 is sensitive to both β-rays and γ-rays, and the element 21 is sensitive only to γ-rays. Thus, by these elements 20 and 21, the intensity of β-rays can be detected.

The construction of the dosimeter in accordance with the present invention has thus been described.

In a known construction, the arrangement of the thermoluminescence dosimeter was relatively simple. The known dosimeter is disadvantageous in that, once the operator fails to perform the heating measurement, the signal on the dosimeter is diminished. This disadvantageous feature of the conventional dosimeter caused a decrease in the reliability thereof.

However, according to the present invention, the dosimeter has a plurality of thermoluminescent elements, so that the above described disadvantages as encountered in the conventional one can be eliminated and that the reliability is remarkably improved.

Further, since the difference between the sensitivities of two thermoluminescent elements can be decreased as low as 0.1 percent by a trimming method, measurements can simultaneously be performed with respect to a plurality of such elements to improve the accuracy and the reliability of the measurement. Whereas in a conventional dosimeter, it has been practically impossible to maintain the tolerance within three percent. Thus, according to the present invention, each of γ-rays, neutrons and β-rays can individually be measured in such a field where γ-rays and neutrons or γ-rays and β-rays exist.

Further, according to the present invention, since a plurality of thermoluminescent elements are secured to one casing, the dosimeter can very conveniently be handled, and is free from a troublesome handling such as gripping individual dosimeters one by one by using a pincette as in conventional ones.

We claim:

1. A complex thermoluminescence dosimeter of the type heating a thermoluminescent material by heated air upon measuring a radiation dose, comprising:
   a frame member of heat resistant material;
   a first thermoluminescent element secured to said frame member, which is insensitive to a first type of radiation and has a first sensitivity to a second type of radiation;
   a second thermoluminescent element secured to said frame member, which is sensitive to said first type of radiation and has a second sensitivity to said second type of radiation different from said first sensitivity; and
   modifying means for modifying one of said first and second sensitivities and for making said one of said first and second sensitivities substantially equal to the other of said first and second sensitivities with respect to said second type of radiation.

2. A complex thermoluminescence dosimeter as defined in claim 1, wherein said modifying means comprises shielding means shielding one of said first and second thermoluminescent elements from at least a portion of said second type of radiation.

3. A complex dosimeter as defined in claim 2, wherein said shielding means comprises a layer of heat resistant paint disposed on at least a portion of the surface of said one of said thermoluminescent element.

* * * * *